Sept. 29, 1970

R. T. HART 3,531,717

ANTENNA NOISE BRIDGE

Filed April 26, 1968

INVENTOR
Robert T. Hart

BY H. Matthews Garland

ATTORNEY

United States Patent Office 3,531,717
Patented Sept. 29, 1970

3,531,717
ANTENNA NOISE BRIDGE
Robert T. Hart, Richardson, Tex., assignor to Omega-T Systems Incorporated, Richardson, Tex., a corporation of Texas
Filed Apr. 26, 1968, Ser. No. 724,521
Int. Cl. G01r 27/00
U.S. Cl. 324—57                                7 Claims

ABSTRACT OF THE DISCLOSURE

A device for testing radio and television antennas, receivers, and the like, including a signal source for producing a broad-band spectrum of noise, an amplifier for amplifying the noise, and a bridge circuit coupled with the amplifier and excited by the amplified noise, the bridge having one leg adapted to receive the component to be tested, means for connecting a frequency sensitive detector, and resistance adjustment means whereby balancing the bridge provides a measure of a characteristic of the component being tested at a selected frequency.

---

This invention relates to testing devices and more particularly relates to devices particularly adapted to testing antennas, receivers and the like.

It is one object of the invention to provide testing devices adapted to measurement of frequencies, resistances, and other characteristics of radio and television equipment and the like.

It is an especially important object of the invention to provide apparatus for the measurement of antenna resonant frequency and radiation resistance.

It is a further object of the invention to provide apparatus of the character described which is readily adapted to the testing of antennas, both mobile and fixed, of a wide variety of types including vertical, dipole, multi-element antennas, or a random system with an antenna tuner.

It is a further object of the invention to provide an antenna measuring device which is quickly, accurately and easily used and economically produced.

It is another object of the invention to provide an antenna testing device of the character described having inherent measurement accuracy when determining the resonant frequency of an antenna which is essentially limited by the accuracy of the receiver or detector used in combination with the device.

It is a further object of the invention to provide a measuring device of the character described which is also adaptable to use as a signal generator for radio receiver testing.

It is another object of the invention to provide a device of the character described which is also usable for determining electrical quarter or half wave lengths of coaxial transmission line for connecting antennas with receivers and transmitters.

It is another object of the invention to provide a device of the character described which includes a broad band noise source exciting a bridge circuit used with a frequency sensitive circuit.

It is a still further object of the invention to provide a testing device which includes a noise source, means for amplifying the output from the noise source, and a bridge network or circuit including a variable impedance in one leg and means for connecting a unit being tested into another leg so that as the current developed by the noise source flows through the unit the bridge is balanced by adjustment of the variable impedance thereby providing an indication of the resistance to current flow of the tested unit.

In accordance with a still further object of the invention one particular form of a testing device embodying the invention includes a noise generator having a silicon Zener diode for producing a broad-band spectrum of noise, circuits comprising a plurality of amplifiers connected in cascade relationship with the noise generator to amplify the diode noise level, and a bridge circuit inductively coupled with the amplifier circuits and having two legs which comprise the secondary of a transformer coupled with the amplifier while the other two legs of the bridge are formed by an adjustable impedance and the unit to be tested, respectively.

It is another object of the invention to provide a testing apparatus of the character described including a transformer between the amplifier and bridge circuit and wherein the bridge circuit per se has a first leg comprising a fixed resistance, a second leg adapted to receive an antenna, receiver or the like to be tested, and third and fourth legs having a common resistance contacted by a movable tap to vary the ratio of the resistance in the third and fourth legs to balance the bridge depending upon the characteristic of the component being tested in the second leg.

Additional objects and advantages of the invention will be readily apparent from the reading of the following description of a device constructed in accordance with the invention, and reference to the accompanying drawings thereof, wherein.

Figure 1:
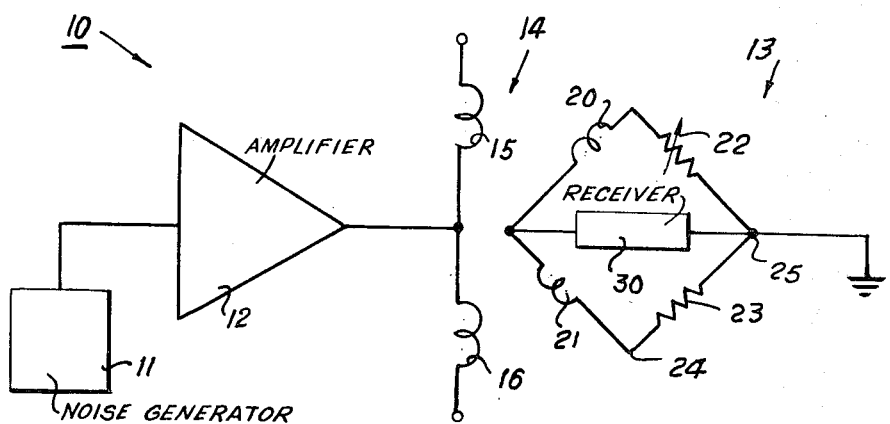
FIG. 1 is a block diagram of a testing device in accordance with the invention.

Referring to FIG. 1, a system 10 including a device in accordance with the invention for testing characteristics of an antenna comprises a noise generator 11 the output of which is fed into an amplifier 12 for raising the generated noise to a usable level. The output of the amplifier is inductively coupled with a bridge 13 by a transformer 14 having primary coils 15 and 16 connected with the amplifier and secondary coils 20 and 21 which form first and second legs of the bridge circuit. A potentiometer 22 forms a third leg of the bridge while the antenna, receiver, or the like to be tested is connected into the bridge forming its fourth leg 23. The tested unit forming the leg 23 is connected into the bridge at the points 24 and 25, the point 25 forming a common connection with the potentiometer 22 forming the third leg of the bridge. A suitable receiver 30 is connected into the bridge between the point 25 and the connecting point 31 of the bridge which is common to its legs 20 and 21. It should be emphasized that while testing an antenna, receiver, or the like with the device of the invention the tested unit and the receiver 30 are connected with the device forming a part of the testing system but they do not comprise a part of the device itself which is usable with any desired tested antenna, receiver, or the like and any suitable receiver may be connected across the bridge when using the system.

Briefly, in operation the noise generator produces a broad-band spectrum of noise which is fed to the amplifier 12 causing current flow in the primary coils 15 and 16 of the transformer 14 which induces current flow in the transformer secondary coils comprising legs 20 and 21 of the bridge causing current flow in the third and fourth legs of the bridge comprising the adjustable impedance 22 and the device 23 being tested. The impedance 22 is adjusted until the bridge is balanced as determined by the receiver 30 which serves as a null detector. If the receiver has an S meter the null point may be determined both by listening to the noise in the receiver and by watching the S meter. The receiver is tuned until there is minimal audio noise and a minimum S meter reading while substantially simultaneously the impedance 22 is adjusted to provide minimum noise from the receiver. The final setting of the impedance 22 which provides the best noise null indicates the value of the radiation resistance of an antenna being tested while the frequency setting of the receiver at which the best noise null is found indicates the resonant frequency of the antenna.

Figure 2:
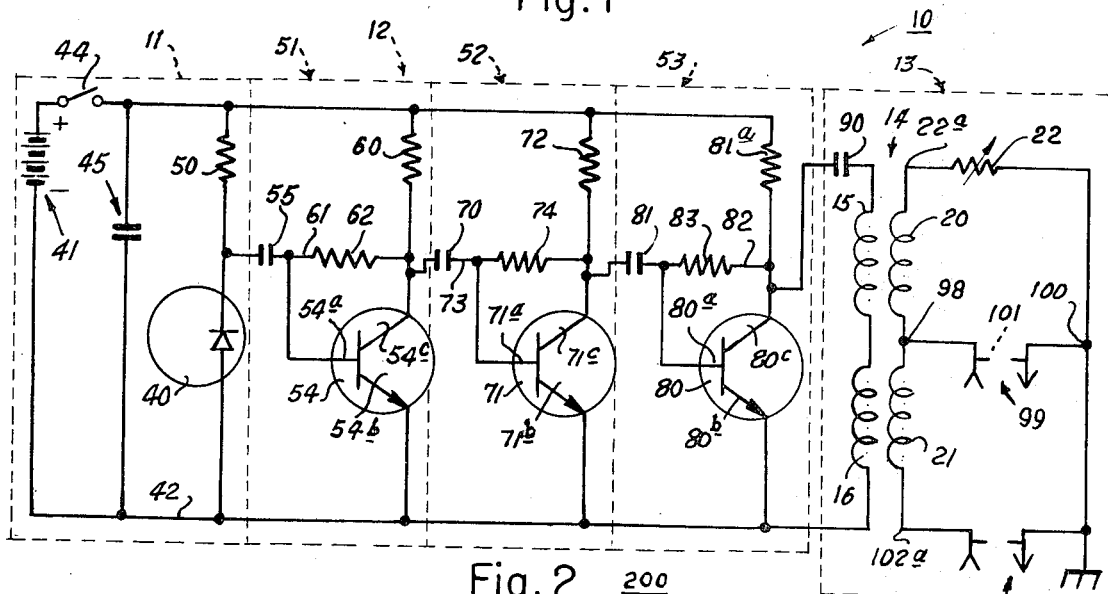
FIG. 2 is a circuit diagram of one specific embodiment of a testing device constructed in accordance with the invention.

A specific preferred embodiment of the device of the invention is schematically illustrated in FIG. 2. The source of noise in the noise generator 11 is a diode 40 connected with a direct current voltage source 41 by leads 42 and 43 in the circuits to the cathode and anode, respectively, of the diode. The cathode of the diode is connected with the positive side of the voltage source by the lead 43 while the anode is connected through the lead 42, to the negative side of the voltage source whereby the diode is back biased by the voltage source. The diode 40 preferably is a silicon Zener diode which produces a broad-band spectrum of random noise in the circuit as shown. The Zener diode is particularly adapted to the present application due to the breakdown properties of its P-N junction which permits a substantial increase in reverse current flow when the reverse voltage applied across the diode exceeds a predetermined value. While these features are characteristic of Zener diodes, extensive testing may be necessary to select a diode which is capable of producing both the desired high amplitude noise and broad frequency spectrum. The use of such a diode for the purpose of noise generation is illustrated and described in U.S. Pat. No. 3,281,711, issued to Harvey M. Kees and Bertram A. Krevor on Oct. 25, 1966. The lead 43 is connected through a switch 44 to control the application of voltage to the noise generator and the amplifier circuits. An alternating-current bypass capacitor 45 is connected in parallel with the diode between the leads 42 and 43 for short circuiting the alternating current to keep it off the power supply. A resistor 50 is connected in series with the diode 40 between its anode and the lead 43 to supply optimum bias voltage across the diode. The resistor 50 also serves to limit the current through the diode to a safe value when Zener breakdown occurs allowing a current surge through the diode. An excessive current will damage or destroy the diode.

The output of the noise generator is fed into the amplifier 12 which in this preferred embodiment comprises cascade connected amplifiers 51, 52 and 53 to provide the desired gain. The amplifier 51 includes a transistor 54 of the NPN type with its base 54a connected with the diode 40 through a coupling capacitor 55. The emitter 54b of the transistor is connected with the anode of the diode 40 by way of the lead 42. Thus, the diode 40 is in the base-emitter circuit of the transistor 54 which comprises the input circuit of the amplifier 51 and includes the coupling or blocking capacitor 55. A resistor 60 is connected between the collector 54c of the transistor 54 and the lead 43 to the voltage source. A lead 61 including a resistor 62 is connected between the collector 54c of the transistor 54 and the base input of the transistor between its base and the capacitor 55 to provide feedback from the output of the amplifier transistor 54 into the base input.

The collector-output circuit of the amplifier 51 is connected through a coupling condenser 70 to the base 71a of an NPN type transistor 71 of the amplifier 52. The emitter 71b of the transistor 71 is connected to the lead 42 from the voltage source 41. The collector 71c of the transistor 71 is connected through a resistor 72 to the lead 43 from the voltage source. A lead 73 including a resistor 74 is connected between the collector 71c of the transistor 71 and the base 71a of the transistor providing a feed-back circuit from the output of the transistor to its base. The amplifier 53 includes an NPN type transistor 80 having an input base circuit leading from the base 80a through a coupling capacitor 81 to the collector 71c output of the transistor 71 of the amplifier 52. The emitter 80b of the transistor 80 is connected with the lead 42 to the voltage source. The output collector 80c of the transistor 80 is connected by way of a resistor 81a to the lead 43 from the voltage source. Feed-back from the output collector circuit of the transistor 80 is provided by way of a lead 82 connected through a resistor 83 from the collector 80c of the transistor 80 to the input base 80a of the transistor.

The series connected primary coils 15 and 16 of the transformer 14 are connected at one end through a coupling capacitor 90 to the output collector 80c of the transistor 80 between the transistor and the resistor 81 in the output circuit of the amplifier 53. The other end of the primary coils of the transformer is connected with the lead 42 to the voltage source. The transformer 14 which includes both the series connected primary coils 15 and 16 and also the series connected secondary coils 20 and 21 forming two legs of the bridge circuit 13 is preferably of a special design. The transformer includes a ferrite toroid core having a quadrifilar winding which comprises four wires twisted together prior to wrapping on the core and then wound on the core forming four complete turns around the core. Two of the wires are connected together in series to form the windings 15 and 16 with the free end of the winding 15 connected with the capacitor 90 and the free end of the winding 16 connected to the lead 42 providing the primary coils of the transformer. The other two wires are similarly connected together in series providing the secondary coils 20 and 21 of the transformer which comprise two legs of the bridge circuit 13. This particular technique of transformer construction assures a high accuracy center tap on the secondary winding for connection of the receiver or detector 30 and to provide good capacitive balance. The ferrite toroid core especially adapts the transformer to use with higher frequencies.

One terminal 98 of a shielded connector 99 is connected to the center connection of the secondary coils of the transformer forming the legs 20 and 21 of the bridge 13. The shielded connector may be either a phonojack or a coaxial cable connector which is adapted to receive a mating connector on the detector receiver 30. The free end 20a of the transformer secondary coil 20 is connected to one end of the potentiometer 22 which is connected at its other end to the other terminal 100 of the connector 99. The free end 21a of the other transformer secondary coil forming the leg 21 of the bridge is connected with a terminal 102a of a shielded connector 102 which also may be a phonojack or coaxial cable connector of the socket type. The other terminal 102b of the connector 102 is connected with the terminal 100 of the connector 99 which, as already stated, is connected with the potentiometer. The connector 102 is adapted to receive the device, such as an antenna, to be tested. Thus, the bridge 13 has two connected legs 20 and 21 comprising the secondary of the transformer and a potentiometer 22 and means for connection of a device to be tested which form the opposite two legs of the bridge. The connector 99 provides for the connection of a receiver or other detector for indicating a balanced condition in the bridge.

Typical components in the above described testing device are:

| | |
|---|---|
| Voltage source 41 | 9 volt battery. |
| Capacitor 45 | 0.001 mf. |
| Capacitor 55 | 0.001 mf. |
| Capacitor 70 | 0.001 mf. |
| Capacitor 81 | 0.001 mf. |
| Capacitor 90 | 0.001 mf. |
| Resistor 50 | 2700 ohms. |
| Resistor 62 | 22,000 ohms. |
| Resistor 60 | 1200 ohms. |
| Resistor 74 | 22,000 ohms. |
| Resistor 72 | 1200 ohms. |
| Resistor 83 | 10,000 ohms. |
| Resistor 81 | 680 ohms. |
| Diode 40 | Zener diode (Hoffman HW 6.8A). |
| Transistors 54, 71 and 80 | 2N3563. |
| Potentiometer 22 | 100 ohm composition control. |
| Transformer 14 | 4 quadrifilar turns of No. 28 enamel wire on ⅜-inch O.D. ferrite core (Indiana General type CF 102Q2 core). |

The entire apparatus of the invention represented in FIG. 2 is readily and compactly packaged in a case or container, not shown, provided with a front control panel on which are positioned the switch 44, the potentiometer adjustment knob and dial, and the socket connectors 99 and 102 for the receiver detector and the device to be tested, respectively. The device is extremely light weight and portable and thus readily moved by the operator to any desired location for use.

One of the basic applications of the testing device of the invention is the measurement of the radiation resistance and resonant frequency of an antenna, which may be either mobile or fixed, and may be a vertical, dipole, beam, or quad antenna, or may be a random system having an antenna tuner. The antenna to be tested is coupled with the testing device by a suitable plug, not shown, inserted from the antenna into the connector 102 so that the antenna as previously discussed, comprises a leg of the bridge 13. A radio receiver is coupled by a suitable plug with the connector 99 to provide a detector for determining when the bridge is in a balanced condition. The receiver may be either a very simple unit with which the noise null and thus balance of the bridge is monitored or determined by listening for a minimum audio noise, or the radio may be a receiver of a type including an S-meter which provides a visual indication of the audio noise level. The potentiometer is set at an estimated value of the radiation resistance of the antenna. The switch 44 is closed to apply voltage to the noise generator 11. Since the diode 40 is back biased and the voltage applied to the diode is in excess of the breakdown or Zener voltage, the diode produces a broad-band spectrum of high amplitude random noise as a sharply increased current flows through the diode. The current is limited by the resistor 50 to a safe value to prevent damage to or destruction of the diode. The alternating current noise signal oscillations produced by the diode while the Zener voltage on the diode is exceeded is supplied through the coupling capacitor 55 to the base 54a of the transistor 54 of the first amplifier 51. The output of the first amplifier 51 is supplied from the collector 54c of the transistor via the coupling capacitor 70 to the base 71a of the transistor 71 of the second amplifier 52. The output of the second amplifier is supplied through the collector 71c of its transistor through the coupling capacitor 81 to the base 80a of the transistor 80 of the third amplifier 53. The output of the third amplifier is supplied by way of the collector 80c of its transistor and the coupling capacitor 90 to the primary coils 15 and 16 of the transformer 14. The amplified signal oscillations flowing in the primary coils 15 and 16 of the transformer induce corresponding alternating current signal oscillations in the secondary coils of the transformer forming the first and second legs 20 and 21 of the bridge. The voltage differential between the terminals 22a and 102a of the bridge causes signal current to also flow in the opposite legs of the bridge through the potentiometer 22 and the antenna 102 being tested. The receiver determines when the voltage between the terminals 98 and 100 at the midpoints of opposite pairs of the bridge legs is zero and thereby the bridge is balanced.

With the amplified signal current supplied by the noise generator exciting the bridge the receiver is tuned over the range where antenna resonance is expected until the best noise null occurs and/or the minimum S-meter reading is observed. The potentiometer having previously been adjusted to an estimated value of antenna radiation resistance is further adjusted to provide the best noise null from the receiver. Repetition of the adjustments of both the receiver frequency setting and the setting of the potentiometer several times is desired to provide highest accuracy in the readings of both the resonant frequency and the radiation resistance of the antenna. When it is determined that the bridge is balanced by such adjustments the resonant frequency of the antenna is determined from the receiver dial and the radiation resistance of the antenna is read from the potentiometer.

Figure 4:
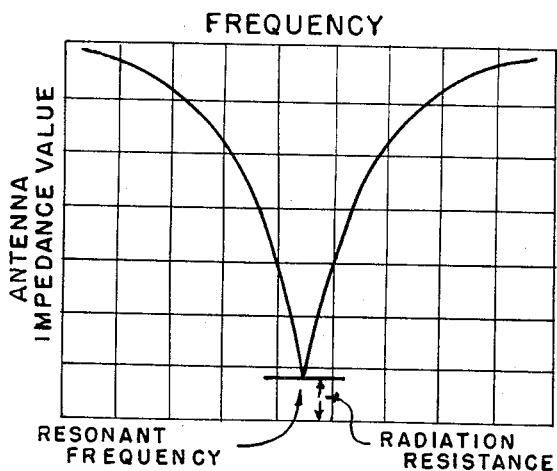
FIG. 4 is a frequency versus impedance graph useful in explaining the invention.

The bridge, of course, can be balanced only when the value set on the dial of the potentiometer equals the resistive value of the antenna. Resonance in the antenna occurs at the frequency at which the inductive and capacitive components of the antenna exactly cancel each other. When such occurs that impedance of the antenna is thereby at a minimum value which is the radiation resistance of the antenna. As evidenced in the graph illustrated in FIG. 4, the impedance of the antenna rises very rapidly at frequencies higher or lower than resonance. At frequencies other than resonance the antenna reactive components, both capacitive and inductive, prevent the bridge from being balanced due to phase differentials created by the reactance which prevents effecting a zero voltage between the terminals 98 and 100 and the inability of the potentiometer alone to match the antenna impedance. Thus, when the resonant frequency of the antenna is found by the receiver the reactive components cancel each other out, thereby leaving only the radiation resistance of the antenna which is balanced by the resistance of the potentiometer. It will be recognized that many other alternating current signals are in the bridge and antenna as produced by the noise generator but only those of the resonant frequency of the antenna are seen by the receiver and potentiometer when the excited bridge is properly adjusted.

The use of the multiple amplifiers in the cascade circuit arrangement provides enough gain to raise the diode noise level to a value sufficiently high to be useful with high gain antennas over crowded band conditions. The alternating current signals as amplified are sufficiently greater than many signals in the atmosphere and picked up by the antenna that they dominate or override such signals to enable the test procedure with the bridge to be carried out. Without such amplification the signals in the atmosphere would preclude proper operation of the bridge. Typically the circuit produces a noise level in excess 30 db over S9 which assures accurate measurements in high QRM.

The particular transistors and their associated bias networks disclosed herein were selected to provide maximum performance. The 2N3563 transistor has a gain-band width product of 900 mc. thereby allowing the use of a resistance capacitive (RC) coupled amplifier even at frequencies above 100 mc.

The noise level of the device is essentially constant over the entire high frequency and very high frequency spectrums which also permits use of the unit as a signal generator for receiver testing in accordance with standard procedures.

For most effective operation of an antenna system the antenna and the transmission line to the antenna should be matched so that the antenna radiation resistance is the same as the characteristic impedance of the transmission line to prevent development of standing waves. The present testing device may also be employed to determine the proper length of coax to use. Since the bridge of the testing device can measure only what it effectively sees in the antenna system it measures the impedance looking into the line at the "station end." If the transmission line is a half wave length at the null frequency the resistance shown by the bridge will be the antenna resistance thereby indicating the desirability of the proper selection of the wave length of he coax employed.

The testing device is also utilized for determining electrical quarter or half wave length of coax. The potentiometer of the testing device is set at zero. For determining quarter-wave length of coax, the coax is open at its far end, while in determining half wave length of coax the coax is shorted at the far end. With the potentiometer thus set at zero ohms, the coax being measured is coupled with the connector 102 and the receiver is tuned to attempt to find a noise null. If the noise null is not found, the length of coax is shortened or cut at the near end of the testing device and the coax is reconnected with an attempt again being made at finding the noise null on the receiver. This procedure is repeated until a noise null is indicated on the receiver at which time the coax will be of the proper wave length.

If measurement of an antenna are desired at other than resonant frequency modifications to the bridge are necessary so that when the bridge is excited it can be balanced. Under such circumstances, in order to provide a bridge that can be balanced, it is necessary that calibrated inductance and capacitance components be included in the leg 22 of the bridge to provide the capability of balancing the bridge to the desired frequency. The components are to balance or equal the inductance or capacitive of the antenna at the desired non-resonant frequency to permit balance of the bridge.

The specific embodiment of the testing device for which the component specifications are set out herein was designed for 50-ohm coax systems and for operation in the general frequency range below 100 mc. In this particular system the potentiometer has minimum distributed capacitance which is not significant in the operation of the device within its design limits. Increasing the resistance of the potentiometer to accommodate the testing device to 300-ohm antenna systems, however, significantly degrades the accuracy of the measurements provided by the device unless the distributed capacitance of the potentiometer is compensated for. Such compensation may be accomplished by placing an equivalent capacitor across the antenna terminal to permit the leg of the bridge including the antenna to have the same capacitance as the leg of the bridge including the potentiometer having distributed capacitance of enough significance to require compensation.

Figure 3:
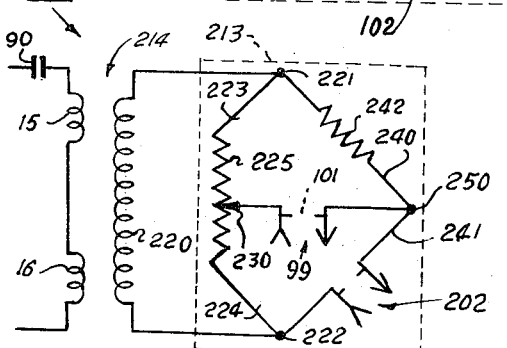
FIG. 3 is a fragmentary circuit diagram illustrating a modified form of the testing device for use at higher frequencies than the embodiment shown in FIG. 2.

Another form of the testing device 200 particularly adapted to frequencies up to 500 mc. is illustrated in FIG. 3. The testing device 200 includes the same noise generator and amplifying circuits already described in the testing device 10 illustrated specifically in FIG. 2. The device 200, however, has a modified form of bridge circuit 213 which is excited by and inductively coupled with the third amplifier stage 53 by a transformer 214 which includes the primary coils 15 and 16 connected with the amplifier circuit through the coupling capacitor 90. The transformer has a secondary coil 220 connected at one end with a terminal 221 of the bridge circuit and at the other end with a terminal 222 of the bridge circuit. One pair of legs 223 and 224 of the bridge circuit include a common resistance 225 which is contacted by a movable tap 230 connected with one terminal of the socket connector 99 for the null detector receiver 101. The ratio of the resistance in the legs 223 and 224 is varied by movement of the tap 230. The other two legs 240 and 241 of the bridge circuit connected between the terminals 221 and 222 include, respectively, a fixed resistance 242 and a socket connector 202 for coupling the antenna, receiver, or coaxial transmission line to be tested into the bridge circuit. The other terminal of the socket connector 99 for the receiver detector used in balancing the bridge is connected with a terminal 250 which is common to and connects the legs 240 and 241 of the bridge. Thus, in the device 10 of FIG. 2 the secondary coils of the transformer comprise two legs of the bridge whereas in the testing device 200 of FIG. 3 the secondary coil of the transformer serves only to inductively couple the bridge circuit with the amplifier so that the noise generator excites the bridge but the transformer secondary coils do not actually form a part of the bridge circuit per se. Further, the potentiometer 22 of the device 10 has been replaced with a fixed resistance while the two legs along the other side of the bridge include the resistance 225 which is contacted by the movable tap 230, the position of which is controlled by a dial on the front of the case of the device, not shown, which is calibrated in ohms.

The testing device 200 is operated in exactly the same manner as the device 10 as already explained. The amplified alternating current noise oscillations in the transformer primary coils 15 and 16 induce corresponding oscillations in the transformer secondary coil 220 thereby exciting the bridge circuit causing alternating current noise oscillations in the legs of the bridge circuit between the terminals 221 and 222. The receiver detector for determining the resonant frequency and noise null is, of course, coupled in the usual fashion into the socket connector 99. A noise null is found by adjustments of the receiver frequency control and also the position of the movable tap 230 by manipulation of the calibrated dial on the face of the testing device 200 until the noise null point has been located accurately. Several adjustments of the resistance measurement dial and the frequency dial of the receiver are preferred for optimum accuracy.

As previously explained, instead of varying a potentiometer in one leg this particular form of the testing device varies the portions of the resistance 225 included in the legs 223 and 224 of the bridge until the bridge is balanced. When finally adjusted by proper determination of the noise null, the frequency setting on the receiver indicates the resonant frequency of the antenna or coax being tested while the resistance dial on the device shows the radiation resistance when an antenna is being tested. Length of coax is determined in the same manner as previously discussed with respect to the device 10. The testing device 200 is especially useful in commercial operations due to its ability to handle higher frequencies up to about 500 mc. as the capacitance and inductance in the legs 223 and 224 remain balanced.

Typical components in the testing device 200 when designed for use up to about 500 mc. in testing systems having impedance up to about 100 ohms are identical to those already specified for the device 10, except, however, for the transformer and bridge circuits elements. The transformer may comprise a single wire coil or a primary connected with the amplifier stage 53 in lieu of the coils 15 and 16 and may have a single wire coil as the secondary 220. The two transformer coils, primary and secondary, are wound on the ferrite toroid core previously described. The resistance 225 is a 100 ohm potentiometer and the fixed resistance 242 is a 50 ohm resistor.

While the preferred forms of the testing device include the amplification circuits illustrated and described it will be recognized that a noise generator providing noise signals at a sufficiently high level may not require amplification and thus may be coupled directly with the bridge so that the testing device will comprise a noise generator and a bridge adapted to receive an antenna or other unit to be tested to form one of its legs and to receive a form of detector such as a receiver for a determination of the balance of the bridge.

It will now be seen that a new and improved form of testing apparatus has been described and illustrated and that the apparatus is particularly adapted to testing various characteristics of antennas, receivers, coaxial transmission cable, and the like. In its broader concept the device includes a noise generator and a bridge circuit excitable by the noise generator and adapted to receive a frequency responsive detector for determining balance of the bridge and component such as the antenna, coaxial cable or the like, to be tested, in one leg of the bridge.

In one specific form the testing device comprises a noise generator, an amplifier for raising the level of the signals generated by the noise generator, and a bridge circuit excited by the amplified alternating current signal oscillations emanating from the noise generator, the bridge circuit having one leg including a potentiometer, another leg adapted to receive the device or unit to be tested, and means for receiving a frequency responsive detector for determining the balance of the bridge. In another specific form the bridge circuit has one leg including a fixed resistance, one leg receiving the component to be tested and two legs having a common resistance contacted by a movable tap connected with the socket for the null detector. In this latter form of the device the bridge circuit does not include the secondary coil of the inductive coupling to the noise generator amplifier. The testing device is especially useful in determination of the resonant frequency of antennas and antenna systems, in the determination of quarter and half wave lengths of coaxial transmission lines, and in certain receiver tests wherein it is desired to feed a noise signal into the receiver.

What is claimed and desired to be secured by Letters Patent is:

1. Testing apparatus comprising: a broad-band non-discreet source of noise voltage comprising a diode; amplifying means connected with said diode; an inductive coupling having primary windings connected with said amplifying means; discreet frequency selective detecting means comprising a bridge circuit, first and second legs of said bridge circuit comprising secondary windings of said inductive coupling, an adjustable impedance comprising a third leg of said bridge circuit, said bridge circuit being adapted to be coupled with means to be excited and tested by said apparatus responsive to said noise voltage whereby said means to be tested comprises a fourth leg of said bridge; and means for connecting a frequency selective detector to said bridge circuit as a null detector and for indicating a frequency at which said circuit is balanced when excited by said noise voltage.

2. Testing apparatus comprising: a broad-band non-discreet source of noise voltage comprising a diode; amplifying means connected with said diode; an inductive coupling connected with said amplifying means; discreet frequency selected detecting means comprising a bridge circuit connected with said inductive coupling; said bridge circuit having a first leg comprising a fixed resistance, a second leg adapted to include means to be tested by said apparatus, third and fourth legs including a common resistance contacted by a movable tap for varying the ratio of resistances of said third and fourth legs, and means for connecting a frequency selective null detector between said movable tap and a fixed tap between said first and second legs of said circuit for determining a frequency at which said bridge is balanced.

3. The apparatus of claim 1 wherein said inductive coupling comprises a transformer having a quadrifilar winding on a ferrite toroid core, a first pair of wires of said winding being connected to each other and with said amplifier means providing primary coils of said transformer comprising said primary windings of said inductive coupling and a second pair of wires of said winding being connected together in said bridge circuit providing secondary windings of said transformer and said first and second legs of said bridge circuit.

4. Apparatus in accordance with claim 3 wherein said amplifier means comprises a cascade circuit including a plurality of transistor amplifiers to amplify the noise level of the noise voltage emitted by the noise voltage source.

5. Apparatus as defined in claim 4 wherein said adjustable impedance comprises a potentiometer.

6. A testing device comprising: a direct current voltage source; a non-discreet noise generator circuit coupled with said voltage source including a back-biased Zener diode for producing a broad-band spectrum of high amplitude noise voltage; amplifier circuit means coupled with said noise generator circuit for raising the noise level of the output of said noise generator circuit including at least one transistor; a bridge circuit inuductively coupled with said amplifier circuit, said bridge circuit including one leg having variable resistance means and one leg including means for coupling a device to be tested into said bridge circuit; means connected across said bridge circuit for connecting a receiver to provide a frequency selective null detector for determining the balance of said bridge at a selected frequency; and a receiver connected with said last mentioned means to provide a discreet frequency selective null detector for determining the balance of said bridge at a selectable frequency.

7. A testing device comprising: support means for a source of direct current voltage; a non-discreet noise generator circuit connected with said support means including a solid state diode connected whereby said diode is reversed biased responsive to a direct current voltage applied thereto to generate a broad-band spectrum of noise voltages, an alternating current by-pass capacitor connected across said diode between said battery support means and said diode, and a resistance connected in series with said diode for effecting a desired voltage drop across said diode and limiting the current through said diode; amplifier circuit means connected with said noise generator for amplifying the noise voltage generated by said diode, said amplifier circuit means including at least one transistor having a base electrode coupled through a capacitor to said diode; a bridge circuit coupled with said amplifier circuit means; transformer means coupling said bridge circuit with said amplifier circuit means, the primary windings of said transformer being connected with said amplifier circuit means and the secondary windings of said transformer being connected with said bridge circuit; one leg of said bridge circuit being adapted to be connected with apparatus to be tested by said testing device whereby said apparatus comprises a leg of said bridge circuit; and said bridge circuit being connected with discreet frequency selected detector means comprising a receiver connected across said bridge circuit to provide a null detector for balancing said bridge circuit and to indicate the frequency at which a balance of said bridge circuit is achieved when excited by said noise voltage generator.

References Cited

UNITED STATES PATENTS

| | | | |
|---|---|---|---|
| 2,476,954 | 7/1949 | Blackburn | 324—56 |
| 2,805,392 | 9/1957 | Schnoll | 324—62 |
| 2,939,079 | 5/1960 | Willmore | 324—158 |
| 3,225,297 | 12/1965 | Burley et al. | 324—62 |
| 3,281,711 | 10/1966 | Kees et al. | 331—78 |
| 1,914,414 | 6/1933 | Fairchild. | |

OTHER REFERENCES

Noise—Figure Measurements, Product Bulletin from Airborne Instruments Laboratory, 1965, New York, p. 12.

RUDOLPH V. ROLINEC, Primary Examiner

R. J. CORCORAN, Assistant Examiner